Dec. 1, 1925.  1,563,993
A. L. JOHNSTON, JR
AUTOMATIC MACHINE FOR MAKING CHAINS
Filed Oct. 25, 1920        4 Sheets-Sheet 1

Fig.1

INVENTOR
BY
ATTORNEYS

Dec. 1, 1925.

A. L. JOHNSTON, JR 1,563,993

AUTOMATIC MACHINE FOR MAKING CHAINS

Filed Oct. 25, 1920

INVENTOR

BY
ATTORNEYS

Dec. 1, 1925.

A. L. JOHNSTON, JR

1,563,993

AUTOMATIC MACHINE FOR MAKING CHAINS

Filed Oct. 25, 1920     4 Sheets-Sheet 3

INVENTOR
A. L. Johnston Jr.
BY
ATTORNEYS

Dec. 1, 1925.  
A. L. JOHNSTON, JR  
1,563,993  
AUTOMATIC MACHINE FOR MAKING CHAINS  
Filed Oct. 25, 1920  
4 Sheets-Sheet 4

INVENTOR  
A. L. Johnston Jr.  
BY  
ATTORNEYS

Patented Dec. 1, 1925.

1,563,993

UNITED STATES PATENT OFFICE.

ANDREW LANGSTAFF JOHNSTON, JR., OF NEW YORK, N. Y., ASSIGNOR, BY MESNE ASSIGNMENTS, TO OFF'N'ON CHAIN CORPORATION, OF NEW YORK, N. Y., A CORPORATION OF DELAWARE.

AUTOMATIC MACHINE FOR MAKING CHAINS.

Application filed October 25, 1920. Serial No. 419,220.

*To all whom it may concern:*

Be it known that I, ANDREW LANGSTAFF JOHNSTON, Jr., a citizen of the United States, residing at New York, in the county of New York and State of New York, have invented certain new and useful Improvements in Automatic Machines for Making Chains, of which the following is a full, clear, and exact description, such as will enable others skilled in the art to which it appertains to make and use the same.

This invention relates to chain-making machines and more particularly to automatic machines for manufacturing short length units such as are used, for example, in anti-skid chains for automobiles.

It is an object of the invention to provide a reliable and efficient machine for manufacturing chains each consisting of a predetermined number of links.

It is another object of the invention to provide a machine for automatically forming and ejecting such units without interrupting the feed of stock material, and without waste.

It is a further object to provide a machine of the character described which possesses features of structural superiority and functional advantage.

Other objects will be in part obvious and in part pointed out hereinafter in connection with the following description of a preferred embodiment of the invention, illustrated in the accompanying drawings, wherein.

Figure 1:
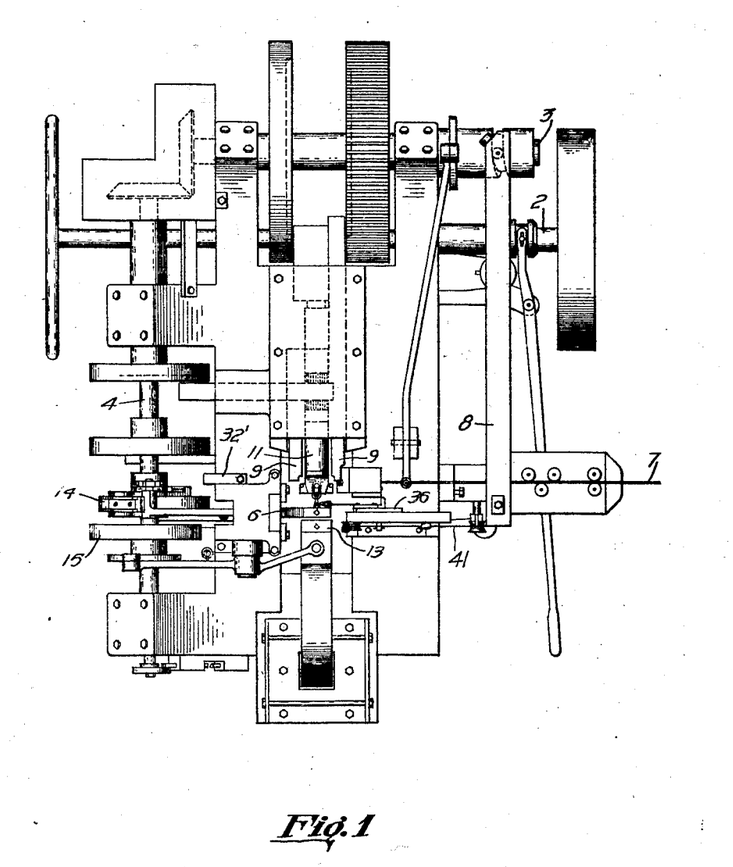
Figure 1 is a top view of a machine embodying the invention.
Figure 2:
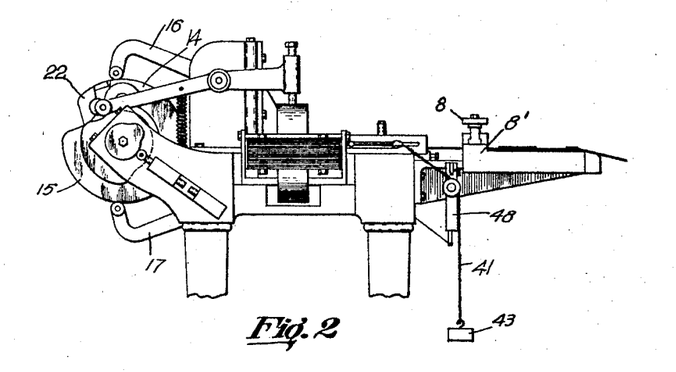
Fig. 2 is a front elevation of such a machine with certain parts omitted.
Figure 3:
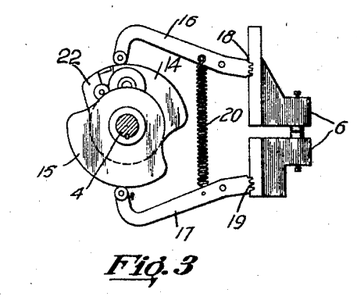
Fig. 3 is a front elevation of a gripping mechanism.

There is illustrated in Figs. 1 and 2 a machine for manufacturing welded wire chain which includes the improvements forming the subject matter of the present invention. The mechanism for cutting and shaping wire to form connected links is generally disclosed and claimed in United States Patent No. 987,295 dated March 21, 1911, to which reference may be had for more detailed explanation. Briefly, the chain-making machine proper includes a table 1 by which the various mechanisms are supported on suitable brackets and bearings, a power drive shaft 2, a driven shaft 3 provided with various cam devices for operating certain of the link-forming mechanisms, and a counter shaft 4 driven by shaft 3 and carrying various cams for other parts.

Figure 4:
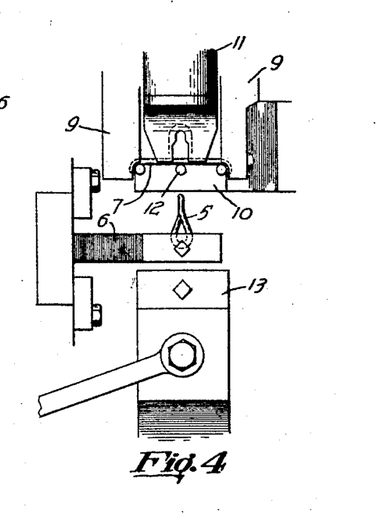
Fig. 4 is a fragmentary top view of the mechanism for forming, welding and gripping a chain link.
Figure 5:
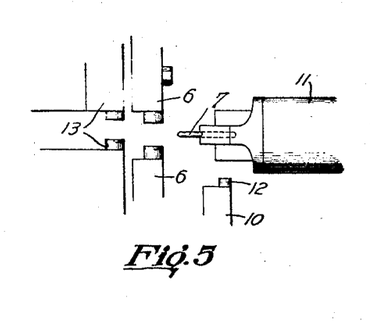
Fig. 5 is a fragmentary side elevation of the same mechanism.

The operation of shaping links and forming connected chains therefrom is indicated in Figs. 1, 2, 3, 4 and 5. Presupposing an already formed link 5 to be held by a pair of gripping jaws 6 (as shown in Fig. 4) a suitable length of wire 7 is fed to the machine by a lever 8 and feed slide 8' connected thereto. The side tools 9, one of which is provided with cutting mechanism, advance to sever a length of wire and to bend the ends of the blank thus made around an anvil 10, whereupon the anvil descends slightly and the U-ing tool 11 advances to bend the blank around an upstanding pin 12 carried by the anvil 10 and to close the ends of the blank within the preceding link 5 held by the gripping jaws. At this point the gripping jaws are released, the premade link is moved to the side (as will appear), the anvil 10 makes a further descent and the U-ing tool 11 then advances and positions the end of the new link between a pair of welding jaws 13. These latter are now forcibly but yieldingly clamped together and an electric circuit is automatically closed to heat the electrodes of the welding jaws.

After the welding operation the jaws are opened and the link is withdrawn by the U-ing tool and placed between the gripping jaws 6, which now come together to clamp the welded end of the link while the U-ing tool holding the other end of the link is turned through a quarter revolution. By this rotary motion the link is twisted and put in a position to receive the succeeding link; that is, it is shaped as and assumes the position of link 5 shown in Fig. 4. The U-ing tool then recedes to its initial position and the cycle of operation is repeated. The tools 9, 10 and 11, and the gripping jaws 6 and welding jaws 13 are automatically timed and moved to effect the cycle described by cooperating cam parts arranged on the driven shaft 3 and the counter-shaft 4. The general construction is apparent from Fig. 1, and may be understood more fully by reference to the patent to Graves, 987,295, mentioned.

Special mechanism for the operation of the gripping jaws is shown more in detail in Figs. 3, 6, 7 and 8. In the present embodiment the shaft 4 is provided with two cams 14 and 15, one or both of which may be of improved construction as will be explained in detail, which press apart the ends of two levers 16 and 17 bearing suitable rollers. These levers are pivoted adjacent their other end and are provided with sectors 18 and 19 bearing teeth which mesh with a rack on the gripping jaws 6 and operate to reciprocate the latter within suitable ways held by the table. A spring 20 serves to separate the gripping jaws and hold the roller ends of levers 16 and 17 against their cams 14 and 15.

The present improvement provides means for allowing periodic release of a completed link from between the gripping jaws 6 immediately before a succeeding link would be otherwise threaded therein, and further provides means for positively taking away the links already formed without obstructing or delaying the continuing operation of the link-shaping and other devices. In other words, a series of connected links are formed at regular intervals, and at predetermined periodic intervals the latest completed link (into which the next made link would normally be threaded) is released by the operation of an improved cam and the chain unit already formed is removed, so that the succeeding link constitutes the first of the next series unit. Following the formation of this next link the take-away mechanism is automatically advanced to engage therewith. The moment of periodic release mentioned and of the withdrawing operation of the take-away mechanism are coincident and the entire action is automatic.

Figure 6:
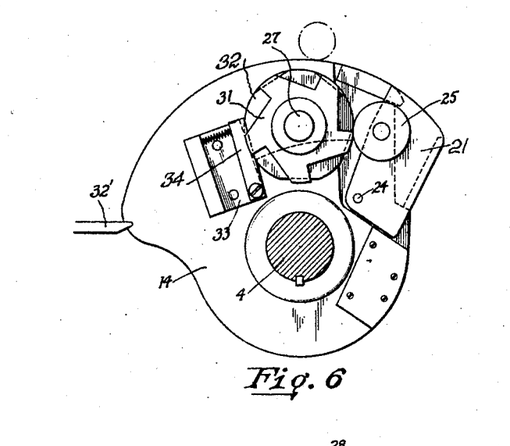
Fig. 6 is a back face view of the means for operating the gripping mechanism.
Figure 7:
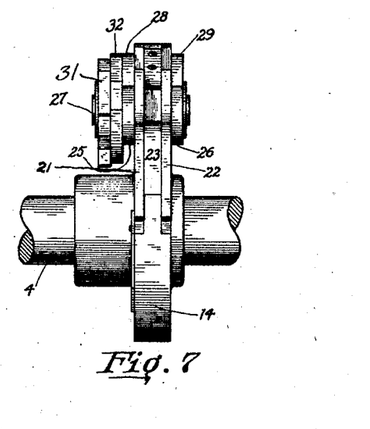
Fig. 7 is an edge view of the same.
Figure 8:
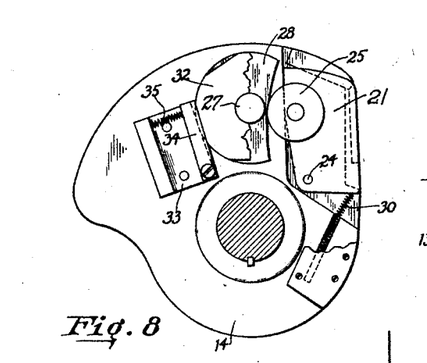
Fig. 8 is a back face view of the same in another condition with certain parts broken away.

The device for effecting termination of a made unit and the beginning of a succeeding unit may be embodied in suitable means, a typical embodiment being shown in detail in Figs. 6, 7 and 8, where the cam 14 is of a construction to provide chain units consisting of five connected links, and the description thereof will be especially concerned with such a five link unit, although it will be apparent and is to be understood that the invention is susceptible of application to provide chain units containing various numbers of links as desired. As has been described, the cams 14 and 15, keyed to the shaft 4, operate to clamp together the gripping jaws 6. In the present embodiment the cam 14 only is of special construction to allow what may be termed premature separation of the gripping jaws at certain periodic intervals, but the cam 15 might be of similar construction if desired to cause a wider or longer opening of the gripping jaws. The cam 14 has a surface for depressing the upper gripping jaw and consisting of that part of its periphery having the longer radius, and this operative surface is adapted to be shortened at periodic intervals between the limits illustrated in Figs. 6 and 8. The cam 14 is provided with an auxiliary depressible surface consisting of two plates 21 and 22 embracing a thinner portion of cam 14 and joined by a member 23 and pivoted at 24 on the cam. Plate 21 carries a roller 25 and plate 22 carries a similar roller 26. A stub-shaft 27 projects from the cam proper and carries mutilated disks 28 and 29 upon which the rollers 25 and 26 respectively bear and which normally hold the auxiliary cam surface in the position shown in Fig. 6, but which allow a pivotal motion of the auxiliary cam surface inward when the disks are in the position shown in Fig. 8 where the roller 25 is bearing upon the cut-in part of the disk 28. This pivotal motion of the auxiliary surface may be assisted as by a compression spring 30 reacting between the body of the cam and the heel of plate 21. The stub shaft 27 also carries a star wheel 31 and a disk 32 whose circumference is flattened at points corresponding to the teeth of the wheel 31. At each revolution of the cam 14, one of the teeth of the star wheel 31 is engaged by a stationary finger 32' on the bed of the machine, and the star wheel is thereby rotated upon the cam through one-fifth of a revolution. Consequently, at every fifth revolution of the cam 14, and therefore at the completion of each fifth link, the disks 28 and 29 (said disks and star wheel turning together) reach the position shown in Fig. 8 and the auxiliary cam surface is allowed to swing inwardly, thus decreasing the length of camming surface for the gripping jaw lever 16 and allowing premature or earlier relative separation of the gripping jaws and quickened release of the terminal completed link 5. The fifth or nth link of the short chain unit is thus released and permitted removal prior to the finished U-ing of the next blank, so that the fifth and sixth links are not connected. To insure exact positioning of the flattened disk 32, the cam 14 carries a plate 33 having a member 34 pivoted adjacent an end and forced against the disk 32 by a spring 35. As the disk 32 rotates its regular position is thus insured by cooperation between the flats of its surface and the spring-pressed member 34.

As previously mentioned the preferred embodiment of the invention also includes suitable cooperating mechanism for positively removing the chain links as made and for holding the links as finished clear from the machine parts active in making the succeeding links.

Figure 9:
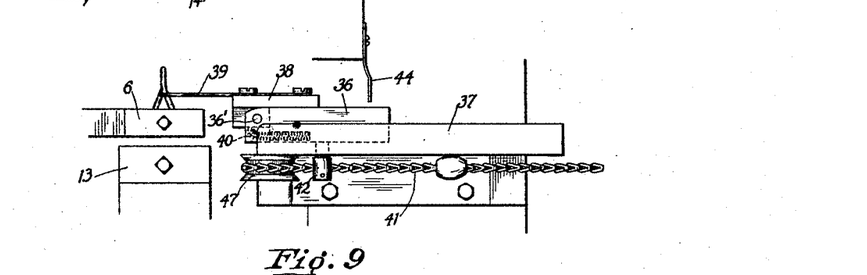
Fig. 9 is a fragmentary top view of the take-away mechanism.
Figure 10:
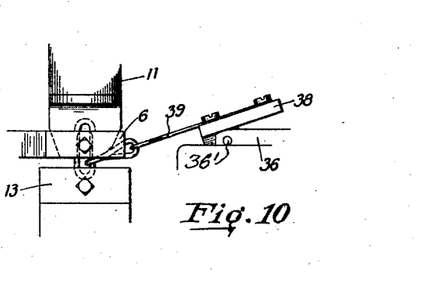
Fig. 10 is a fragmentary top view of part of the same mechanism.
Figures 11, 12:
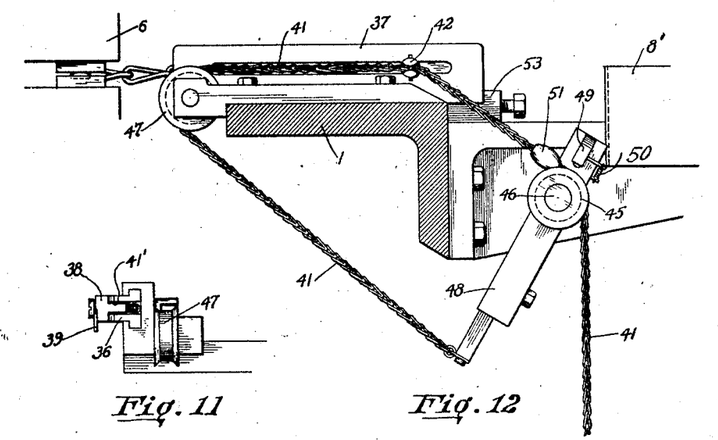
Fig. 11 is an end view of the take-away slide.
Fig. 12 is a front elevation of the take-away mechanism.
Figures 13, 14:
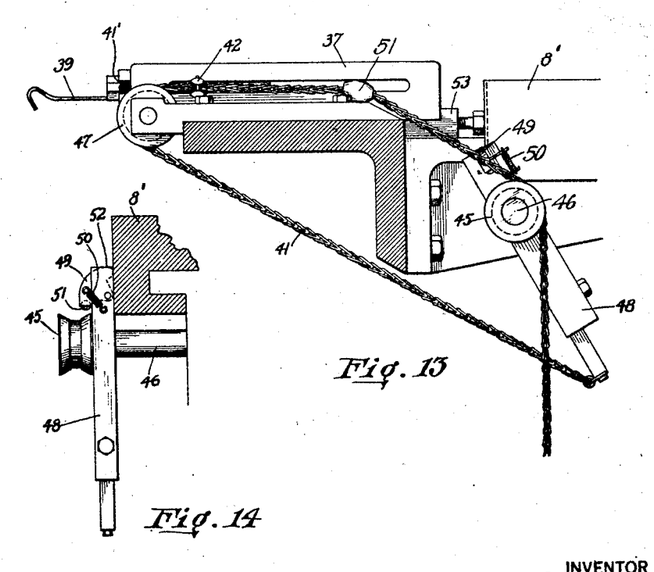
Fig. 13 is a similar elevation at another period.
Fig. 14 is a fragmentary side elevation of part of the take-away mechanism.

Fig. 9 represents a fragmentary top view of the mechanism referred to in an operative position where the first link of a chain unit to be made is completed and is clamped by the gripping jaws 6. The takeaway mechanism includes a member 36 slidable, as will be described, along a stationary part 37 fixed to the machine body. At the front end of the member 36 and connected by a vertical pivot 36' is an auxiliary member 38 which carries a spring hook 39 adapted to engage each first link of the chain units when made and held by the gripping jaws. This hook carrying member 38 is normally retained in parallel relationship with the sliding member 36 by a spring 40 but by means of the pivotal connection therewith is allowed a slight swinging movement to a position as shown in Fig. 10 at which the second link of a series unit is clamped within the welding jaws 13. The connection between the members 38 and 36 also preferably allows a slight vertical play, as shown at 41' in Fig. 11, to facilitate the engagement of the hook 39 with the first made link 5. The parts described which carry the hook 39 are normally urged away from the link making elements, that is, the center of the machine, by tension on a chain 41 which is fastened by a pin 42 to the member 36. Such tension may conveniently be imposed by a weight 43 on the pendant end of the chain as shown in Fig. 2 or by other suitable means. The chain 41 passes up from the weight 43 over a roller 45 journaled on a suitable stub 46, transversely adjacent the hook carrying parts, and over a roller 47 and thence reversely again for connection with the lower end of a lever 48 also journaled at the stub 46. As each succeeding link is added to the chain unit the takeaway mechanism recedes correspondingly thus clearing the pre-made links from the chain making parts, until the mechanism reaches the position shown in Fig. 12 at which the fifth or other predetermined final link in the chain unit is shown held by the gripping jaws. The upper end of lever 48 is provided with a trigger member 49 pivoted thereto and normally held in the retracted position shown in Fig. 14 by a tension spring 50. As soon, however, as the fifth or final link is released by the heretofore described action of the retractable cam plates 21 and 22, that is, immediately following the position of the parts in Fig. 12, weight 43 pulls away and drops the released chain unit and a ball 51 or the like, carried by the chain 41 passes over the roller 45 and forces upwardly the end 52 of the trigger 49, thus causing the end 52 to project back from the lever 48 and lie in the path of the wire feed slide 8'. The slide 8' then advances to feed in the wire for a succeeding link, and in this movement strikes the projection 52 and thereby carries along the upper end of the lever 48. Accordingly the lower end of the lever is forced outwardly and the chain 41 thereby drawn over the roller 47 thus advancing the member 36 by connection with the pin 42 and raising the weight 43 to assume the former position shown in Fig. 13 where the hook 39 engages the first made link in the succeeding unit (Fig. 9) for repeating the cycle of operation. It will be understood that the hook 39 withdraws the completed chain unit at the moment of premature release of the terminal link in the unit by the gripper levers 16 and 17 and thus jerks the unit out of the field of operation where it may fall by gravity through a suitable opening in the machine bed. If desired a guard 44 may be provided to render the fall of the completed chain unit certain. For convenience in adjustment the length of the lever 48 may be variable at its lower end and there is also preferably provided an adjustable stop 53 for the feed slide 8'.

The operation of the various mechanisms will be clear from the foregoing description thereof. It is to be noted that the feed of the wire blank and the bending of a link therefrom are not interrupted or delayed or affected by the periodic take-away of a completed chain unit. The trigger 49 which is pushed by the wire feed slide 8' is not tripped by the ball 51 until the slide has carried forward the wire length which is to form the blank for the initial link in the next chain unit and it is only when the slide 8' has withdrawn to advance the material for the second link that the trigger is allowed to project for actuation on the return stroke. The general operation of the machine thus insures a continuing cycle of feeding the wire, cutting it to make the blanks, bending into links, welding, and repeating the operation to produce units of five concatenated links. It is to be noted furthermore that the speed of production is in no wise decreased by the separation of the chain into short lengths of predetermined links, and that there is no wastage of the material stock. It will also be understood that the invention is susceptible of modification without sacrifice of the objects described and is capable of application to machines for making chains wherein the links may be of a variety of forms.

As many changes of the above construction might be made and many apparently different embodiments of the invention are possible without departing from the scope thereof, it is intended that all matter shown in the accompanying drawings or contained in the above description shall be interpreted as illustrative and not in a limiting sense.

Having described my invention, what I claim as new and desire to secure by Letters Patent is—

1. In an automatic power driven chain-making machine, the combination with means operative in regular recurrent sequence to form blanks and shape the same into links, of means to effect periodically interrupted threaded connection thereof for producing separate chain units each comprising a predetermined plurality of connected links.

2. In an automatic chain-making machine, the combination with material feeding means, blank cutting means and link shaping means, all operative in regular sequence, of means independent of said above mentioned means for effecting periodic interruption of the threaded connection of the links as shaped without interference with the link shaping means to produce separate chain units each comprising a predetermined plurality of connected links.

3. In an automatic chain making machine, in combination, means to hold a formed link, means to form a succeeding link threaded in the preceding formed link as held by said holding means, means operative at intervals to release formed links held by said holding means, and means operative at predetermined intervals to vary the operative time relation of said link forming means and said releasing means to interrupt threading of successive links whereby chain units are produced each having a predetermined plurality of connected links.

4. In an automatic chain-making machine, in combination, means to make a plurality of successive links, each threaded through the preceding link, and means to vary the operation of said first means periodically to interrupt the threaded connection of the links at predetermined intervals without interruption in the formation of the links.

5. In an automatic chain-making machine, in combination, means to make successive links, each having threaded connection with the preceding link, and means to interrupt the connection between successive links at regularly recurring intervals without interrupting the making of the links.

6. In an automatic chain-making machine, in combination, means to make successive links each having threaded connection with the preceding link, and means operative at periodic recurrent intervals to prematurely release a made link thereby to interrupt the threaded connection.

7. In an automatic chain-making machine, in combination, means to hold a made link, means to make a succeeding link and thread the same through the held link, and means periodically operative to release the latest made link prior to the threaded connection of the next making link thereto.

8. In an automatic chain-making machine, in combination, means to clamp a bent link, means to shape a blank to make the next link with threaded connection to the clamped link, and means whereby said first means releases each of a plurality of successive clamped links after the threaded connection of the next shaped link thereto and releases the then next clamped link prior to the threaded connection of the then next shaped link thereto.

9. In a chain-making machine, in combination, means to feed wire, means to cut a fed length into a blank, means to bend the blank into a link, means to weld the link, means to clamp and position the welded link while and so that said bending means bends the next blank into threaded connection with said clamped link, means to effect recurrent operation of said before-mentioned means to make connected chain links, and means to effect intermittent premature release of said clamping means for disconnecting the pre-made connected links from the post-made connected links.

10. In a chain-making machine, in combination, means to feed wire, means to cut a fed length into a blank, means to bend the blank into a link, means to weld the link, means to clamp and position the welded link while and so that said bending means bends the next blank into threaded connection with said clamped link, means to effect recurrent operation of said before-mentioned means to make connected chain links, and means independent of said feeding, cutting, bending and welding means to effect intermittent premature release of said clamping means for disconnecting the pre-made connected links from the post-made connected links.

11. In a chain-making machine, in combination, means operating in regular recurrent steps to feed material and form the same into links, and means independent of the feeding and forming means for the links operating in intermittent steps to effect the threaded connection of said links into separate units, each comprising a predetermined number of links.

12. In a chain-making machine, in combination, means to make successive separate chain units, each comprising a predetermined plurality of inter-threaded closed links, and means to feed link material at regular intervals to said first-mentioned means.

13. In a chain-making machine, in combination, means to make successive separate chain units, each comprising a predetermined plurality of inter-threaded closed links, and means to feed link material to said first-mentioned means at a regular rate.

14. In a chain-making machine, in combination, means operative at intervals to release a completed link prior to the threaded connection of a succeeding link thereto, and means to take away said completed link when thus released.

15. In a chain-making machine, in combination, means to make a succession of chain units, each comprising a plurality of inter-threaded closed links, and means to engage the first link of each unit as made and to remove each unit as completed from the field of operation of said first means.

16. In a chain-making machine, in combination, means to make a series of inter-threaded closed links and means for removing the links as made from the field of operation of said first means in making successive links, said second means coacting to release a preceding link and to re-engage a succeeding link.

17. In a chain-making machine, in combination, means to make a series of inter-threaded closed links and including means to feed link material at intervals, and means actuated by said feeding means at certain intervals only to engage each nth link as made and withdraw the same from the field of operation of said first means.

18. In a chain-making machine, in combination, means to make a series of inter-threaded closed links and including means to feed link material at regular intervals, and means actuated by said feeding means at each nth interval only to engage each nth link as made and withdraw the same from the field of operation of said first means.

19. In a chain-making machine, in combination, regularly operative material feeding means, regularly operative cutting and shaping means, and clamping means in connection with the shaping means operative to prematurely release a link at predetermined intervals.

20. In a chain-making machine, in combination, regularly operative material feeding means, regularly operative cutting and shaping means, and clamping means in connection with the shaping means operative to prematurely release a link at predetermined intervals.

21. In a chain-making machine, in combination, regularly operative wire feeding means, regularly operative wire cutting and bending means, and take-away means for the completed links operative by one of said first-mentioned means at predetermined intermittent operations only of the latter to engage each nth link as made.

22. In a chain-making machine, in combination, regularly operative wire feeding means, regularly operative wire cutting and bending means, and take-away means for the completed links operative by said feeding means at predetermined intermittent operations only of the latter to engage each nth link as made.

23. In a take-away mechanism for chain-making machines, means to engage with a made link and normally operative to withdraw the same and successive inter-threaded links from the field of operation, and operating means therefor to periodically effect release of said engaged link and re-engagement of the nth succeeding link by said first means.

24. In a take-away mechanism for chain-making machines, means including a yieldable hook to engage with a made link and normally operative to withdraw the same and successive inter-threaded links from the field of operation, and operating means therefor including a periodically actuated trigger to periodically effect release of said engaged link and re-engagement of the nth succeeding link by said first means.

25. In an automatic chain-making machine, in combination, means to clamp and release links as made, and operating means therefor including a cam constructed to effect a succession of regular clamping and releasing operations by said first means and a periodic intervening premature releasing operation thereby.

26. In an automatic chain-making machine, in combination, means to make inter-threaded links, means to clamp and release links as made, operating means for said second means including a cam constructed to effect a predetermined sequence of clamping and releasing operations of said second means in synchronism with said first means and a periodic intervening earlier releasing operation in relation to said second means, and take-away means operative to engage each link clamped by said second means on the clamping operation next succeeding each of said earlier releasing operations.

27. In a chain making machine, feeding means, cutting and shaping means, clamping means for the links, means for operating each of the said means in synchronism and in regularly recurring cycles, and means controlled by the operating means for causing the clamping means to prematurely release a link at regular intervals.

28. In an automatic chain-making machine, in combination, regularly operative means for shaping a blank to form a closed link, means for clamping a formed link during the shaping of a succeeding blank in threaded connection thereto, and means for operating said clamping means comprising a cam having an operative surface a portion of which is periodically depressible to permit premature release of said clamping means.

29. In an automatic chain-making machine, in combination, regularly operative means for shaping a blank to form a closed link, means for clamping a formed link during the shaping of a succeeding blank in threaded connection thereto, and means for operating said clamping means comprising a cam having an operative surface a portion of which is periodically depressible to permit premature release of said clamping means prior to the threaded connection of a succeeding link and upon completion of a predetermined number of links.

30. In a chain-making machine, in combination, regularly operative link making means, means for clamping made links and means for operating said clamping means comprising a regularly rotatable cam a portion of whose operative surface is periodically depressible to permit premature release of said clamping means.

31. In a chain-making machine, in combination, regularly operative link making means, means for clamping made links and means for operating said clamping means comprising a regularly rotatable cam having a main operative surface and carrying an auxiliary normally operative surface, said auxiliary surface being adapted to be moved periodically into non-operative condition.

32. In a chain-making machine, in combination, regularly operative link making means, means for clamping made links, means for operating said clamping means comprising a regularly rotatable cam having a main operative surface and pivotally carrying a plate provided with a roller and having an auxiliary normally operative surface, said cam carrying a mutilated disc against which said roller is adapted to bear, and means for rotating said disc with respect to said cam over a predetermined fraction of a circumference at each rotation of said cam, said plate being adapted to be rocked into inoperative condition at every complete rotation of said disc on said cam.

33. In a chain-making machine, in combination, regularly operative link making means, means for clamping made links, means for operating said clamping means comprising a regularly rotatable cam having a main operative surface and pivotally carrying a bifurcated plate provided with rollers and having an auxiliary normally operative surface, said cam being provided with a stub-shaft adapted to resist rotation and carrying mutilated discs against which said rollers are adapted to bear and means for causing rotation of said discs with respect to said cam over a predetermined fraction of a circumference at each rotation of said cam, said plate being adapted to be rocked into inoperative condition only upon a complete rotation of said disc on said cam.

34. In an automatic chain-making machine, in combination, a regularly rotatable cam having a main operative surface, a plate provided with one or more rollers, said plate being pivotally carried by said cam and having a supplementary normally operative surface, a stub-shaft carried by said cam and resiliently held from rotation with respect thereto, a mutilated disc mounted on said shaft against which said roller is adapted to bear, a star wheel mounted on said shaft, and means for causing rotation of said shaft on said cam over a predetermined fraction of a circumference at each rotation of said cam comprising a stationary finger adapted to engage successive points of said star wheel, said plate being adapted to be rocked into inoperative condition against the cut-in portion of said mutilated disc at every complete rotation of said shaft on said cam.

35. In a chain-making machine, in combination, means for holding a formed link and releasing the same after an interval, means for threading a link through said formed link, and means for displacing the period of operation of one of said first mentioned means so as to interrupt the threading operation at predetermined intervals while the said first mentioned means continue to function at each cycle of operation thereof.

36. In a chain-making machine, in combination, means for holding a formed link and releasing the same after an interval, means for threading a link through said formed link, cam mechanisms for operating said first mentioned means, and means for operating one of said cam mechanisms to displace the period of operation of one of said first mentioned means so as to interrupt the threading operation at predetermined intervals while the said first mentioned means continue to function at each cycle of operation thereof.

37. In a chain-making machine, in combination, means for holding a formed link and for subsequently releasing the same, means for threading a link through said formed link, both of said means being operable in recurrent cycles for the performance of similar operations on successive chain links, and means for displacing the operative period in a cycle of operations of one of said first mentioned means at which it performs its function, so as to effect interruption at intervals of the threading operation.

38. In a chain-making machine in combination, means for holding a formed link and for subsequently releasing the same, means for threading a link through said formed link, both of said means being operable in recurrent cycles for the performance of similar operations on successive chain links, and a cam mechanism having an extensible and contractable cam face and operating connections thereto for displacing the operative period in a cycle of operation of one of said first mentioned means at which it performs its function, so as to effect interruption at intervals of the threading operation.

39. In a chain-making machine, in combination, means for holding a formed link and for subsequently releasing the same, means for threading a link through said formed link, both of said means being operable in recurrent cycles for the performance of similar operations on successive chain links, means for displacing the operative period in a cycle of operations of one of said first mentioned means at which it performs its function, so as to effect interruption at intervals of the threading operation, and automatic means for setting at intervals said displacing means to perform its displacing function.

40. In a chain-making machine, in combination, means for holding a formed link and for subsequently releasing the same, means for threading a link through said formed link, both of said means being operable in recurrent cycles for the performance of similar operations on successive chain links, a cam mechanism having an extensible and contractable cam face and operating connections thereto for displacing the operative period in a cycle of operations of one of said first mentioned means at which it performs its function, so as to effect interruption at intervals of the threading operation, and automatic means for setting at intervals said cam mechanism to perform its displacing function.

41. In a take-away mechanism for chain-making machines, in combination, a slidable member, a yieldable hook pivotally carried thereby and adapted to engage a made link, means tending to withdraw said slidable member and said hook from the field of link-making operation, means periodically operative to effect release of the link from said hook and means periodically operative subsequently to advance said hook to engage the nth succeeding link.

42. In a chain-making machine, in combination, regularly operative wire feeding means, regularly operative wire cutting and link making means, a slidable member, a yieldable hook member pivotally carried thereby adapted to engage a made link, means tending to withdraw said slidable member and said hook from the field of link-making operation, means periodically operative to effect release of the link from said hook, means intermittently operative by said feeding means subsequently to advance said slidable member to effect engagement of said hook with the nth succeeding link.

43. In a chain-making machine, in combination, regularly operative wire feeding means, regularly operative wire cutting and link making means, a slidable member, a yieldable hook member pivotally carried thereby adapted to engage a made link, means tending to withdraw said slidable member and said hook from the field of link-making operation, means periodically operative to effect release of the link from said hook, means intermittently operative by said feeding means adapted subsequently to advance said slidable member to effect engagement of said hook with the nth succeeding link and including a trigger periodically actuated by said withdrawing means to be engaged by said feeding means.

44. In a chain-making machine, in combination, regularly operative wire cutting and link making means, a slidable member, a plate loosely and pivotally carried thereby, a pivoted yieldable hook carried by said plate and adapted to engage a made link, means tending to withdraw said slidable member from the field of link-making operation, means periodically operative to effect release of the link from said hook, a pivoted lever, a trigger carried by said lever adjacent an end thereof and adapted to be tripped periodically by said withdrawing means, means for rocking said lever upon the tripping of said trigger and operative to advance said slidable member to effect engagement of said hook with the nth succeeding link.

In testimony whereof I affix my signature.

A. LANGSTAFF JOHNSTON, Jr.